UNITED STATES PATENT OFFICE.

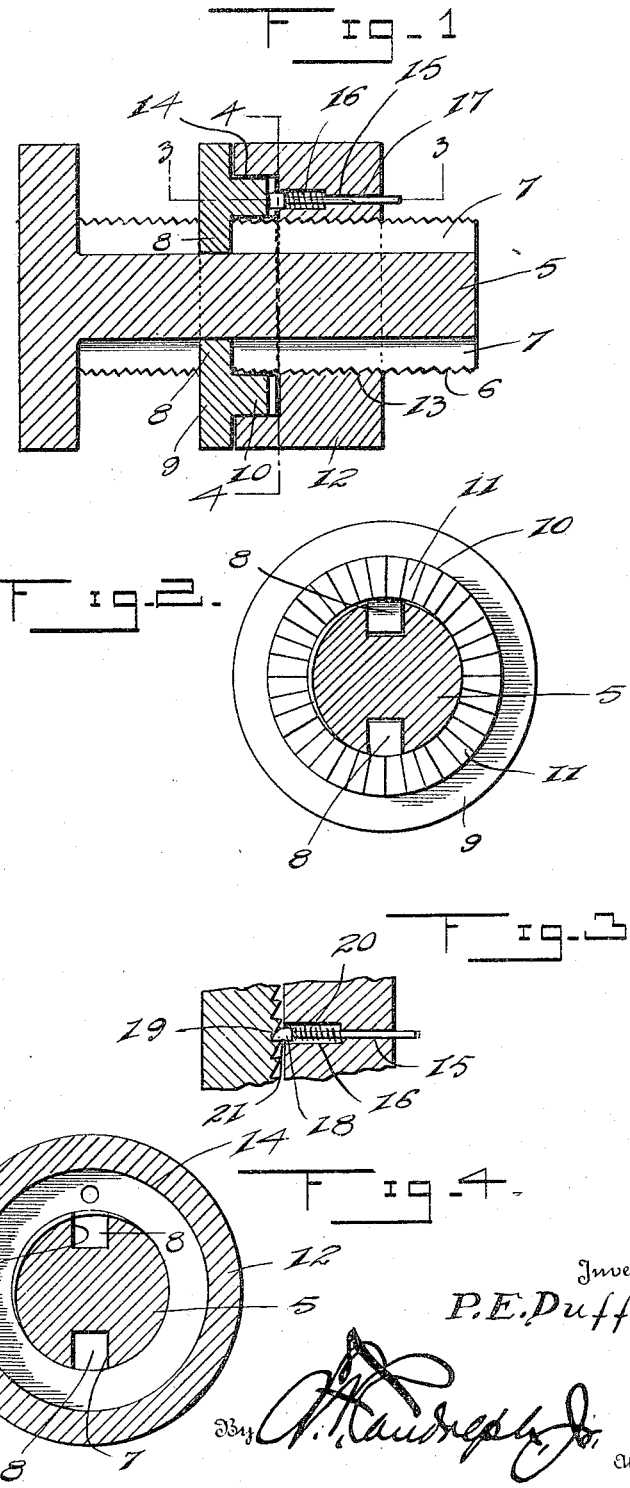

PATRICK E. DUFFY, OF MACE, IDAHO.

NUT-LOCK.

1,193,370.  Specification of Letters Patent.  Patented Aug. 1, 1916.

Application filed March 3, 1916. Serial No. 81,942.

*To all whom it may concern:*

Be it known that I, PATRICK E. DUFFY, a citizen of the United States, residing at Mace, in the county of Shoshone and State of Idaho, have invented certain new and useful Improvements in Nut-Locks; and I do hereby declare the following to be a full, clear, and exact description of the invention, such as will enable others skilled in the art to which it appertains to make and use the same.

This invention has for its primary object to provide a simple and efficient nut lock embodying essentially a non-rotatable washer having ratchet teeth formed thereon adapted to coöperate with a spring actuated locking element slidably mounted transversely of the nut and projecting exteriorly of the latter, whereby the locking element may be withdrawn from engagement with the ratchet teeth and adjusted so as to facilitate removal of the nut.

With this and other objects in view, the invention consists in the novel construction, combination and arrangement of parts as will be hereinafter specifically described, claimed and illustrated in the accompanying drawing, in which:

Figure 1 represents a longitudinal sectional view through the improved nut lock. Fig. 2 represents a transverse sectional view through the bolt, illustrating the lock washer in side elevation, Fig. 3 represents a fragmental sectional view on the line 3—3 of Fig. 1, and Fig. 4 represents a transverse sectional view on the line 4—4 of Fig. 1 in the plane between the lock washer and nut.

Referring to the drawing in detail, wherein similar reference numerals designate corresponding parts throughout the several views, the numeral 5 indicates the shank of a bolt, having the usual external screw threads 6 and diametrically opposed longitudinally extending slots or grooves 7 formed therein slidably receiving the inwardly directed lugs 8 carried by a washer plate 9, whereby the latter is non-rotatably secured upon the bolt shank 5. The outer face of the washer 9 is provided with an integral annular flange 10 spaced concentrically to the aperture therein receiving the bolt shank 5 and having the outer edge thereof cut to define a plurality of ratchet teeth 11. A nut 12, having the usual internally screw threaded bore 13 is fitted upon the screw threads 6 of the bolt shank 5 and is provided in its inner face with an annular groove or channel 14 of a depth approximately corresponding to the width of the flange 10 of the lock washer and adapted to receive said flange.

The nut 12 is formed with a transverse opening 15 extending in parallel relation to the bore 13 thereof and having the inner extremity enlarged in diameter, as indicated at 16. A locking member 17 is slidably and rotatably mounted in the opening 15 and carries at its inner end a head 18, having one side beveled, as at 19, to permit the head 18, when properly adjusted, to ride over the ratchet teeth 11, and thus permit removal of the nut 12, as will hereinafter appear. The head 18 is slidably and rotatably received within the enlarged end 16 of the aperture 15 and is normally retained in inwardly extended position by the tension of a spring 20, engaged at one end with the head 18 and at its opposite end with the shoulder defined by the enlarged portion of the aperture 15.

In use, the lock washer 9 is slipped upon the bolt shank 5 in front of the nut 12, and latter is subsequently advanced to the desired position upon the screw threads 6 of the bolt shank. The slidable locking element 17 is turned by a tool applied to the exposed end thereof so as to dispose the straight face 21 of the head 18 opposite the beveled surface 19 in position for engagement with the working faces of the ratchet teeth 11, and thus the nut 12 is effectively locked against rotary movement with relation to the lock washer 9, while the latter is prevented from rotating upon the bolt shank by the inwardly directed lugs 8 engaging in the longitudinal slots 7. Should it be desired to remove the nut 12 from the bolt shank 5 the slidable locking member 17 is drawn outwardly against the tension of the spring 16 and is given a turn so as to dispose the beveled surface 19 of the head 18 in position to engage the working faces of the ratchet teeth 11, and thus, as the nut is rotated the head 18 and member 17 are moved downwardly against the tension of the spring 20 as the teeth 11 engage the beveled surface 19 of the head 18.

What I claim is:

A nut lock including a bolt, a washer slidably and non-rotatably engaged with said bolt, ratchet teeth arranged in a circular line on the outer face of said washer, a nut fitted upon said bolt, a locking member slidably and rotatably mounted in said nut including a head having one side face thereof beveled and adapted to ride over said ratchet teeth during the rotation of said nut, the outer extremity of said locking member projecting outwardly of the outer face of said nut, whereby said locking member may be withdrawn from engagement with said ratchet teeth, and means normally retaining said locking member in inwardly extended position.

In testimony whereof I affix my signature in presence of two witnesses.

PATRICK E. DUFFY.

Witnesses:
WM. TOWNSON,
FREMONT S. ROWE.